US008812902B2

(12) United States Patent
Deepak

(10) Patent No.: US 8,812,902 B2
(45) Date of Patent: Aug. 19, 2014

(54) METHODS AND SYSTEMS FOR TWO DEVICE FAILURE TOLERANCE IN A RAID 5 STORAGE SYSTEM

(75) Inventor: Majji Venkata Deepak, Karnataka (IN)

(73) Assignee: LSI Corporation, Milpitas, CA (US)

( * ) Notice: Subject to any disclaimer, the term of this patent is extended or adjusted under 35 U.S.C. 154(b) by 276 days.

(21) Appl. No.: 13/368,696

(22) Filed: Feb. 8, 2012

(65) Prior Publication Data
US 2013/0205167 A1 Aug. 8, 2013

(51) Int. Cl.
*G06F 11/00* (2006.01)

(52) U.S. Cl.
USPC .......................................... 714/6.22; 714/6.21

(58) Field of Classification Search
CPC .. G06F 11/16; G06F 11/1616; G06F 11/1654
USPC ................ 714/6.22, 6.24, 6.2, 6.1, 6.21, 6.23
See application file for complete search history.

(56) References Cited

U.S. PATENT DOCUMENTS

| | | | | |
|---|---|---|---|---|
| 5,519,849 | A * | 5/1996 | Malan et al. ................... | 711/114 |
| 8,145,941 | B2 * | 3/2012 | Jacobson ..................... | 714/6.24 |
| 2003/0041278 | A1 * | 2/2003 | Lin .................................. | 714/1 |
| 2003/0221057 | A1 * | 11/2003 | Smith et al. ................... | 711/114 |
| 2005/0193273 | A1 | 9/2005 | Burkey | |
| 2009/0210742 | A1 | 8/2009 | Adarshappanavar et al. | |
| 2010/0017649 | A1 * | 1/2010 | Wu et al. ........................... | 714/6 |
| 2011/0185119 | A1 * | 7/2011 | Madpuwar ..................... | 711/114 |
| 2013/0013857 | A1 * | 1/2013 | Dawkins et al. .............. | 711/114 |

* cited by examiner

*Primary Examiner* — Dieu-Minh Le
(74) *Attorney, Agent, or Firm* — Duft Bornsen & Fettig

(57) ABSTRACT

Methods and systems for two device failure tolerance in a RAID 5 storage system. Features and aspects hereof provide for allocating a spare storage device in the storage system for use with a standard RAID level 5 storage volume to form an enhanced RAID level 5 volume. Additional redundancy information is generated and stored on the spare storage device such that the enhanced RAID level 5 volume is operated by the storage controller so as to survive a failure of up to two of the storage devices of the enhanced volume. The allocated spare storage device may be reallocated by the storage controller for another purpose in which case the storage controller continues to operate the enhanced volume as a standard RAID level 5 volume that can only tolerate a single failure of a storage device of the volume.

21 Claims, 5 Drawing Sheets

METHODS AND SYSTEMS FOR TWO DEVICE FAILURE TOLERANCE IN A RAID 5 STORAGE SYSTEM

BACKGROUND

1. Field of the Invention

The invention relates generally to reliability in storage systems and more specifically relates to methods and systems for tolerating a two device failure in a Redundant Array of Independent Disks (RAID) level 5 volume.

2. Discussion of Related Art

RAID storage systems enhance both reliability and performance of computer storage systems. In general, RAID storage systems provide for performance enhancements by "striping" blocks of data for a logical volume over multiple storage devices (e.g., multiple disk drives). Striping is often referred to as RAID level 0. By striping data, a read or write request may be processed by operating multiple disk drives in parallel to thereby improve performance as compared to a single disk drive servicing the entire request.

RAID storage systems enhance reliability by providing for various forms of redundancy (redundancy information) such that a single disk failure will not disrupt access to the logical volume or risk loss of data. Rather, the RAID logical volume may continue operating and processing requests though possibly in a degraded performance mode without loss of data. For example, RAID level 1 (RAID1) provides enhanced reliability by mirroring data of a disk drive on a second disk drive. Thus if the first drive fails, the second drive assures there will be no loss of data. RAID level 5 (RAID5) enhances performance and reliability by striping user data over multiple storage devices and adding redundancy information to each such stripe (i.e., an XOR parity block added to the data blocks of each stripe). The XOR sum of the data of the other blocks of a strip provides the desired redundancy in that if any single disk drive storing a block of a stripe fails, the data in the block on the failed drive may be reconstructed from the XOR sum of the remaining drives storing other blocks of the stripe. RAID level 6 (RAID6) builds upon the RAID level 5 structure by adding a second redundancy block to each stripe. This second redundancy block typically comprises a Galois field multiplication (GFM) value computed from the data of the other blocks of the stripe (or other forms of redundancy computations). The XOR parity block and the second redundancy block in a RAID 6 configuration assures that no data is lost on the logical volume even if a second drive should fail.

RAID level 1 increases cost per unit of storage to achieve its redundancy in that every unit of data is duplicated thus the physical capacity requirements of a RAID level 1 volume is twice that of the logical capacity. By contrast, RAID level 5 requires one additional disk drive in addition to the two or more other disk drives on which the data is striped. A minimal RAID level 5 configuration requires three disk drives with the capacity of one of the three or more devices being used for the redundancy information. Any number of additional disk drives may be added to a RAID level 5 volume to increase the storage capacity without increasing the overhead allocation for the parity redundancy information. However, a standard RAID level 5 volume can still tolerate no more than a single drive failure without losing data. RAID level 6 similarly adds cost as compared to RAID level 5 storage management due to the additional drive capacity required for the additional redundancy information. As for the parity information of RAID5, the additional redundancy information is typically spread throughout the various drives of the volume and thus the added drive is a permanent part of the RAID level 6 volume configuration. However, RAID level 6 volumes can tolerate up to two drive failures.

Thus it is an ongoing challenge to provide tolerance for a two drive failure in a RAID level 5 configuration without permanently allocating additional storage capacity as is required for RAID1 and RAID6.

SUMMARY

The present invention solves the above and other problems, thereby advancing the state of the useful arts, by providing methods and systems for enhancing a RAID level 5 volume to tolerate a two disk failure. According to features and aspects hereof, an additional storage device may be added to a standard RAID level 5 volume and all additional redundancy information (e.g., GFM redundancy information) is configured to reside entirely on the additional drive. Thus, in accordance with features and aspects hereof, a standard RAID level 5 volume is enhanced by the additional drive with additional redundancy information to tolerate a two drive failure of the volume. However, unlike standard RAID level 6 volumes, the additional drive may be allocated and deallocated at any time. When allocated and populated with the additional redundancy information, the standard RAID level 5 volume is enhanced to tolerate a two drive failure. If the additional drive needs to be deallocated/reallocated for another purpose in the storage system, it can be removed from the enhanced RAID level 5 volume leaving a standard RAID level 5 volume to carry on processing requests. This transition between a standard RAID5 configuration and the enhanced RAID5 configuration can occur at any time in operation of the storage system without preventing access to the data of the volume (i.e., while continuing to allow access to the volume).

In one aspect hereof, a storage system is provided, the storage system comprising a Redundant Array of Independent Disks (RAID) storage controller and a plurality of storage devices coupled with the RAID storage controller on which the RAID controller stores one or more logical volumes, the plurality of storage devices comprising a spare storage device. The RAID storage controller is adapted to configure a RAID level 5 logical volume stored on the plurality of storage devices. The RAID storage controller is further adapted to allocate the spare storage device to store additional redundancy information associated with the RAID level 5 volume. The RAID level 5 volume in combination with the allocated spare storage device comprises an enhanced RAID level 5 volume. The RAID storage controller is further adapted to continue to operate the enhanced RAID level 5 volume to process I/O requests when two of the storage devices comprising the enhanced RAID level 5 volume fail.

Another aspect hereof provides a method operable in a Redundant Array of Independent Drives (RAID) storage controller coupled with a plurality of storage devices. The plurality of storage devices comprising a spare storage device. The method comprises configuring a RAID level 5 volume on the plurality of storage devices and allocating the spare storage device to store additional redundancy information associated with the RAID level 5 volume. The RAID level 5 volume in combination with the allocated spare storage device comprises an enhanced RAID level 5 volume. The method further comprises generating additional redundancy information for the enhanced RAID level 5 volume and storing the generated additional redundancy information on the allocated spare storage device. The method further comprises operating the enhanced RAID level 5 volume with the additional redundancy information on the allocated spare storage device whereby the RAID storage controller continues to operate the enhanced RAID level 5 volume to process I/O requests when two of the storage devices comprising the enhanced RAID level 5 volume fail.

DETAILED DESCRIPTION OF THE DRAWINGS

Figure 1:
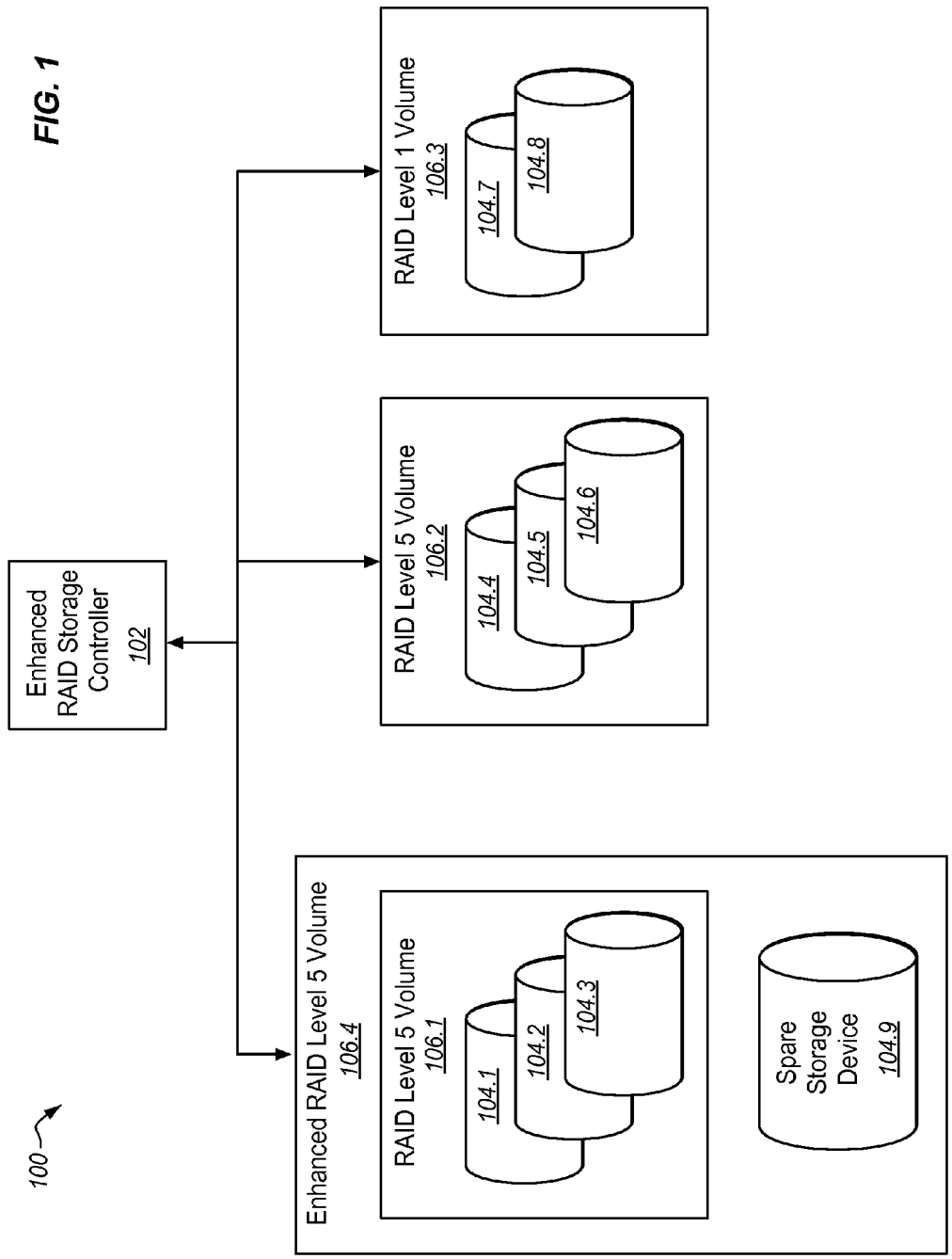
FIG. 1 is a block diagram of an exemplary storage system enhanced in accordance with features and aspects hereof to permit dynamic reconfiguration of a RAID 5 volume to create and enhanced RAID 5 volume that can tolerate failure of up to two storage devices of the volume.

FIG. 1 is a block diagram of an exemplary storage system 100 enhanced in accordance with features and aspects hereof to dynamically reconfigure a standard RAID5 volume into an enhanced RAID5 volume. System 100 comprises enhanced RAID storage controller 102 coupled with a plurality of storage devices 104.1 through 104.9 (also collectively referred to herein as storage devices 104). Controller 102 comprises any suitable electronic components adapted to process I/O requests received from attached host systems (not shown) and to process such received I/O requests by accessing identified portions of the plurality of storage devices 104. Controller 102 may comprise suitably designed logic circuits for such management (custom designed and/or commercially available circuits), suitably programmed instructions stored in a computer readable medium of the storage controller and executed by a general or special purpose process, or combinations of such logic circuits and programmed instructions. Storage devices 104 may comprise magnetic or optical disk drives and/or solid state drives (or combinations of such devices) used for storing data on behalf of attached host systems and for retrieving previously stored data for return to such. Controller 102 may be coupled with storage devices 104 by any of several well-known, commercially available communication media and protocol including, for example, parallel SCSI, Serial Attached SCSI (SAS), parallel Advanced Technology Attachment (PATA), Serial Advanced Technology Attachment (SATA), Fibre Channel (FC), etc.

Controller 102 may configure a variety of logical volumes stored on portions of one or more of the plurality of storage devices 104. For example, RAID5 volume 106.1 comprises a standard RAID5 volume stored on portions of storage devices 104.1, 104.2, and 14.3. RAID5 volume 106.2 comprises portions of storage devices 104.4, 104.5, and 104.6 and RAID 1 volume 106.3 comprising portions of storage devices 104.7 and 104.8. System 100 also comprises one or more spare storage devices 104.9. A spare storage device may be dedicated to use with a particular logical volume (i.e., a "dedicated spare") or may be a global resource within system 100 to be utilized in conjunction with any logical volume defined by controller 102 (i.e., a "global spare"). In general, such spare storage devices may be utilized by controller 102 within system 102 as "hot spares" to automatically rebuild data from a failed storage device within a defined RAID logical volume 106.1, 106.2, or 106.3. A global spare device may be utilized to rebuild failed a device of any of the multiple logical volumes defined by controller 102 whereas a dedicated spare storage device is typically utilized only for replacement and rebuilding of a failed storage device in a particular logical volume with which the dedicated storage device is associated.

Controller 102 is enhanced in accordance with features and aspects care of to utilize spare storage device 104.9 to enhance the functionality of a standard RAID5 volume. In particular, enhanced RAID5 volume 106.4 comprises a standard RAID5 volume 106.1 and spare storage device 104.9. As described further herein below, controller 102 generates and stores additional redundancy information on spare storage device 104.9 to enhance the operation of standard RAID5 volume 106.1 to permit continued operation in the face of failure of any two storage devices of the enhanced RAID5 volume 106.4. Thus, enhanced RAID5 volume 106.4 provide similar tolerance for two device failure as a RAID6 volume but stores all the additional redundancy information on the allocated spare storage device 104.9 rather than integrating the additional redundancy information with other blocks of a standard RAID6 configuration. The additional redundancy information stored on allocated spare storage device 104.9 may be dynamically added to standard RAID5 volume 106.1 to create enhanced RAID 5 volume 106.4 or may be dynamically removed from volume 106.4 leaving standard RAID5 volume 106.1 still operable. Relying on the standard XOR parity present in standard RAID5 volume 106.1 and the additional redundancy information on spare storage device 104.9, enhanced RAID5 volume 106.4 may tolerate failure of any two of the storage devices 104.1, 104.2, 104.3, and 104.9.

In operation, controller 102 is adapted to allocate spare storage device 104.9 for use to store additional redundancy information associated with standard RAID5 volume 106.1. With the additional redundancy information generated and stored on allocated spare storage device 104.9, enhanced RAID5 volume 106.4 may be operated in a manner that tolerates failure of any two of its storage devices. If controller 102 requires spare storage device 104.9 for other purposes within system 100, it may deallocate use of spare storage device 104.9 within enhanced RAID5 volume 106.4 leaving standard RAID5 volume 106.1 to continue operation but without the enhanced capability to tolerate a two disk failure (rather only a single disk failure may be tolerated in accordance with standard RAID5 operation).

In some exemplary embodiments, the additional redundancy information may be generated as Galois field multiplication (GFM) values in accordance with RAID6 techniques. In other exemplary embodiments the additional redundancy information may be generated as Reed-Solomon (RS) information associated with the RAID5 volume 106.1. Either such redundancy information enables enhanced RAID5 volume 106.4 to tolerate failure of any two of its storage devices. As discussed further herein below, deallocation or failure of allocated spare storage device 104.9 allows the standard RAID5 volume 106.1 to continue normal operation in accordance with standard RAID5 management techniques. Failure of any two devices of enhanced RAID5 volume 106.4 allows continued degraded mode operation in accordance with RAID6 storage management techniques until the failed devices are replaced and rebuilt and/or until sufficient devices are replaced and rebuilt to allow continued normal operation of standard RAID5 volume 106.1.

Those of ordinary skill in the art will further recognize that standard RAID5 volume 106.1 may comprise any number of storage devices (at least three) in accordance with standard RAID5 management techniques. Still further, those of ordinary skill in the art will recognize that any number of spare storage devices 104.9 (each designated as dedicated or global) may be present in storage system 100. Thus, the particular configuration shown in FIG. 1 is intended merely as exemplary of one possible embodiment of the enhanced features and aspects hereof. Further, those of ordinary skill in the art will recognize numerous additional and equivalent elements that may be present in a fully functional system 100. Such additional and equivalent elements are omitted herein for simplicity and brevity of this discussion.

Figure 2:
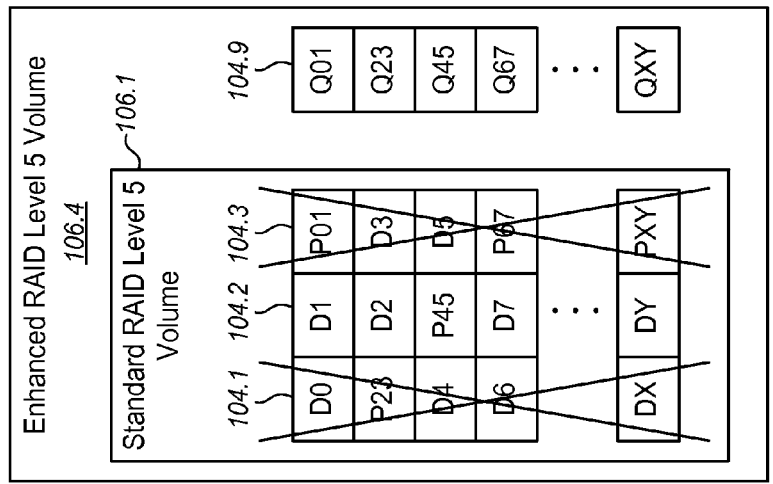
FIGS. 2 through 4 are block diagrams describing exemplary configuration of data on an enhanced RAID5 volume as shown in FIG. 1.

FIG. 2 is a block diagram depicting exemplary configuration of data and redundancy information as may be stored on enhanced RAID5 volume 106.4 of FIG. 1. As noted above, enhanced volume 106.4 comprises a standard RAID5 volume 106.1 and additional redundancy information generated and stored on allocated spare storage device 104.9. As shown in FIG. 2, standard RAID5 volume 106.1 comprises data blocks and associated XOR parity blocks arranged as stripes. For example, a first stripe of volume 106.1 may comprise data block D0 stored on storage device 104.1, data block D1 stored on storage device 104.2, and associated XOR parity block P01 stored on storage device 104.3. Enhanced volume 106.4 adds additional redundancy information Q01 stored on allocated spare storage device 104.9 associated with the same stripe described above in standard RAID5 volume 106.1. In like manner, a second stripe of standard RAID volume 106.1 comprises data blocks D2 and D3 stored on storage devices 104.2 and 104.3, respectively, and XOR parity block P23 stored on storage device 104.1. Enhanced volume 106.4 adds to the second stripe additional redundancy information Q23 stored on storage device 104.9. Other stripes of standard RAID volume 106.1 are similarly distributed over storage devices 104.1, 104.2, and 104.3 with corresponding additional redundancy information stored on storage device 104.9 thereby defining the enhanced volume 106.4.

Figure 3:
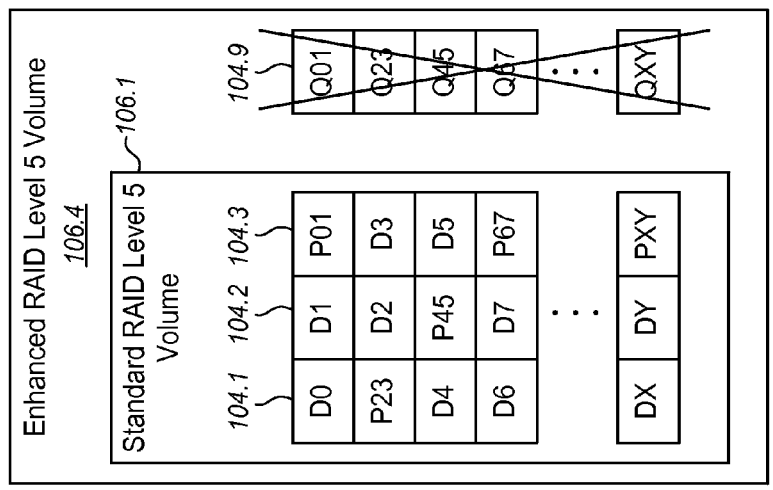

FIG. 3 shows the same data configuration as FIG. 2 with a large "X" through the additional redundancy information stored on allocated spare storage device 104.9 indicating that the device has failed or has been removed from the enhanced volume 106.4. In such a scenario, standard RAID5 volume 106.1 may continue normal operation as a standard RAID5 volume until the additional redundancy information is restored to allocated spare storage device 104.9 or rebuilt on another spare storage device in the case of a failure of spare storage device 104.9 or until spare device 104.9 is again allocated and populated with additional redundancy information for use with volume 106.1 to form enhanced volume 106.4.

Figure 4:
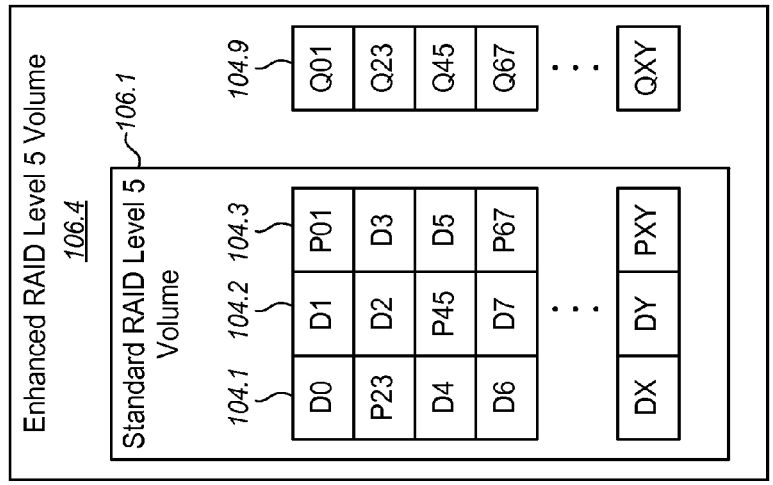

FIG. 4 shows enhanced volume 106.4 (comprising standard RAID5 volume 106.1 and additional redundancy information stored on allocated spare storage device 104.9) this time showing failure of two storage devices (104.1 and 104.3) as indicated by the large "X" over each failed device. In such a scenario, the additional redundancy information on allocated spare storage device 104.9 serves to permit enhanced RAID5 volume 106.4 to continue operation (in a degraded mode) thereby tolerating failure of two storage devices of the enhanced volume. Since the additional redundancy information stored on the device 104.9 survived, the additional redundancy information in conjunction with the surviving data on storage device 104.2 may be used to reconstruct the missing data on storage devices 104.1 and 104.3. Had the allocated spare storage device 104.9 been one of the failing devices (i.e., two of the three devices in standard RAID5 volume 106.1 survived) standard RAID5 management techniques can recover the data missing from the failed device of the standard volume 106.1 and then the recovered information for the standard RAID volume 106.1 may be used to regenerate the additional redundancy information stored on the failed allocated spare storage device 104.9. Those of ordinary skill in the art will readily recognize numerous failure scenarios (of one or two devices of the enhanced volume) for which recovery is possible. In accordance with standard RAID management techniques, while recovery is being performed by rebuild of missing data on additional spare devices, the enhanced volume may be operated in a degraded mode but no data will be lost so long as a third device does not fail.

Figure 5:
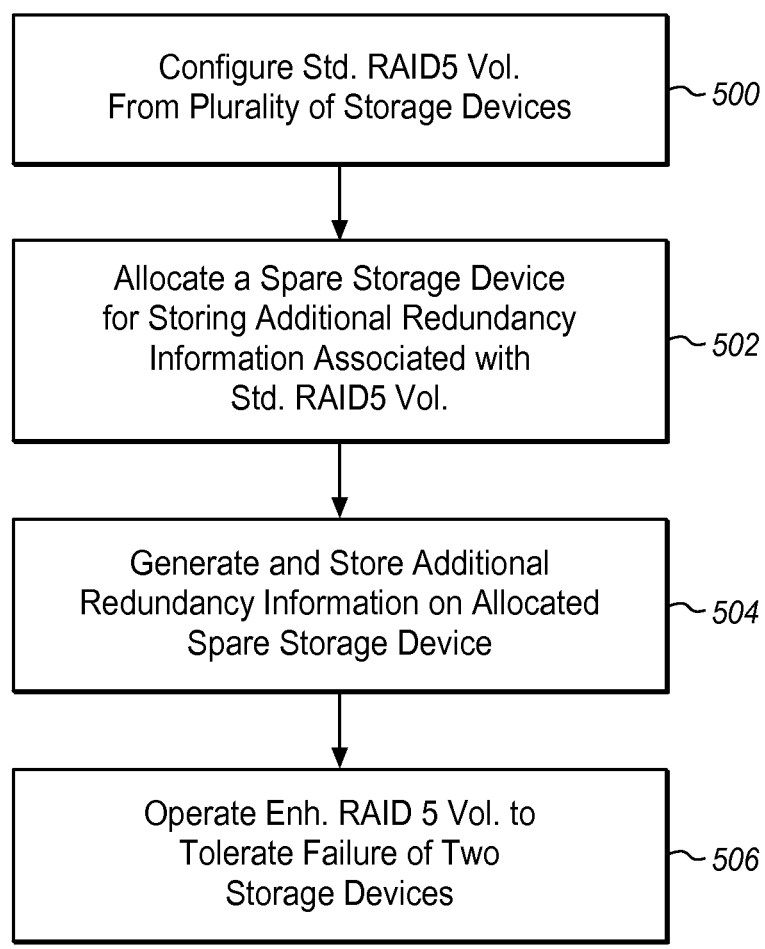
FIGS. 5 and 6 are flowcharts describing exemplary methods in accordance with features and aspects hereof to configure an enhanced RAID5 volume that can be operated to tolerate failure of up to two storage devices of the volume.

FIG. 5 is a flowchart describing exemplary methods for the enhanced storage system. The method of FIG. 5 is operable on an enhanced storage system such as enhanced system 100 of FIG. 1 and more specifically is operable in an enhanced storage controller such as storage controller 102 of FIG. 1. At step 500, a standard RAID5 volume is configured from the plurality of storage devices. As is well known in the art, a standard RAID5 volume comprises three or more storage devices with data and XOR parity distributed as stripes over the multiple storage devices. The standard RAID5 volume so configured may then be operated as a standard RAID5 volume until such time as step 502 allocates a spare storage device for purposes of storing additional redundancy information to be associated with the standard RAID5 volume. At step 504 such additional redundancy information is generated and stored on the allocated spare storage device. As noted above, the additional redundancy information may be generated as GFM values, as RS values, or as any other suitable redundancy information that permits the enhanced volume to continue operation in the presence of failure of two of the volume's storage devices. By associating the additional redundancy information on the allocated spare storage device with the standard RAID5 volume, an enhanced RAID5 volume is configured. The enhanced RAID5 volume may tolerate failure of any two storage devices much in the same way a standard RAID6 volume can tolerate one or two storage device failures. Unlike a standard RAID6 volume, the enhanced RAID5 volume using the allocated spare device with additional redundancy information stores all the additional redundancy information on the spare storage device. Thus, if the spare storage device fails or is re-allocated by the storage controller for another purpose, the standard RAID5 volume may continue normal operation in accordance with RAID5 storage management techniques. At step 506, the enhanced RAID5 volume comprising the standard RAID5 volume with the additional redundancy information generated and stored on the allocated spare storage device may be operated in a normal manner (similar to a RAID6 volume) that withstands failure of up to two storage devices of the volume.

Figure 6:
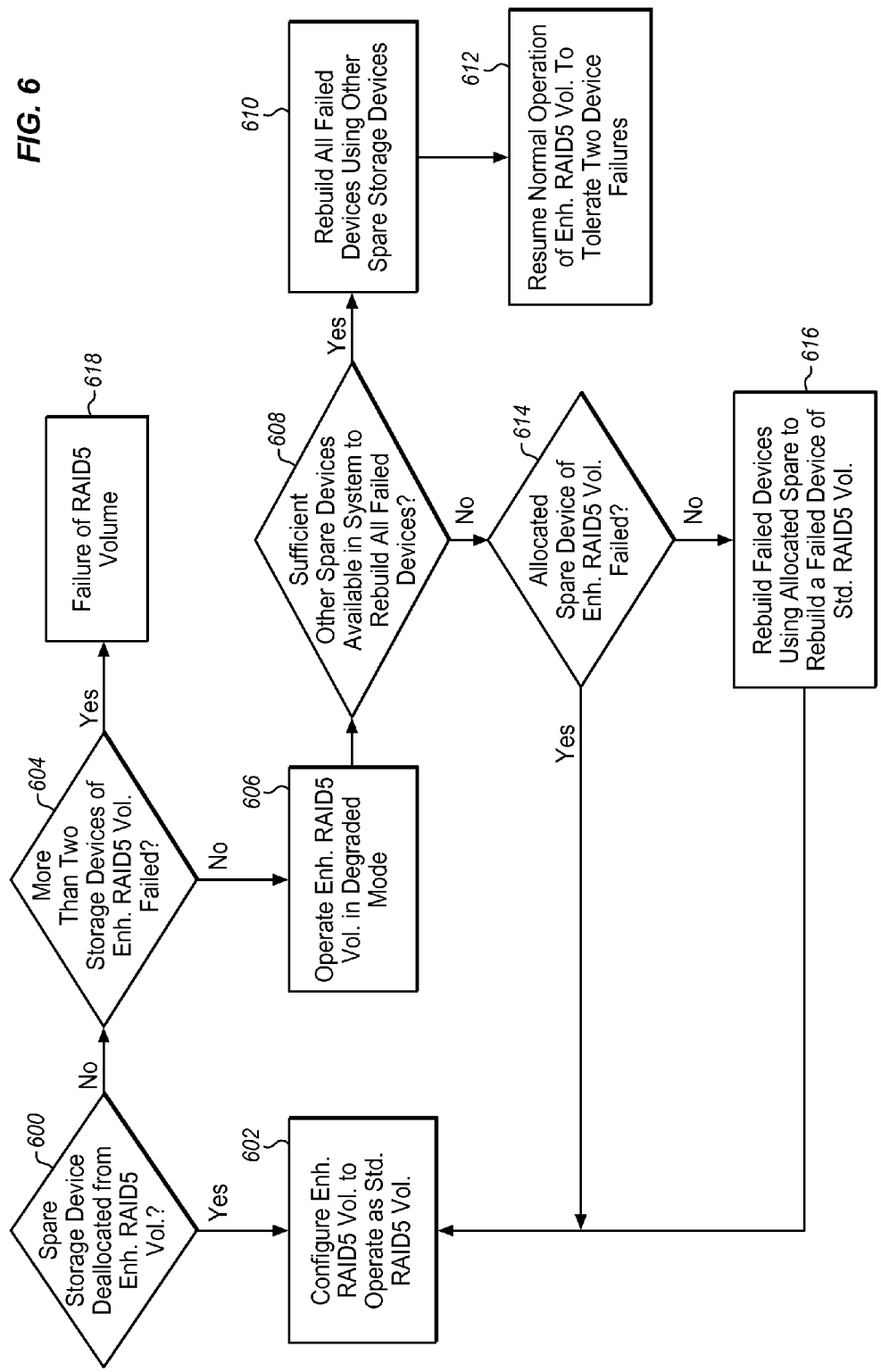

FIG. 6 is a flowchart describing other exemplary methods in accordance with features and aspects hereof to improve RAID5 storage management to withstand failure of two devices of an enhanced volume. The methods of FIG. 6 are operable in an enhanced storage system such as system 100 of FIG. 1 and more specifically operable within an enhanced storage controller such as controller 102 of FIG. 1. In general, the methods of FIG. 6 are operable in response to detecting a failure in the enhanced RAID5 volume or in response to detecting a need to deallocate the allocated spare storage device for other purposes within the enhanced system. At step 600, the controller determines whether the allocated spare storage device has been deallocated from the enhanced RAID5 volume. If so, step 602 reconfigures the enhanced RAID5 volume to operate as a standard RAID5 volume (i.e., as the standard RAID5 volume that existed prior to allocating the spare storage device and utilizing additional redundancy information thereon). Processing within the enhanced storage system then continues utilizing only the standard RAID5 volume in accordance with standard RAID5 management techniques.

If step 600 determines that the allocated spare storage device has not been deallocated for another purpose in the system, then a failure of some storage devices of the enhanced volume has been detected. Step 604 then determines whether the detected failure was a failure of more than two storage devices of the enhanced RAID5 volume. If so, step 618 indicates a total failure of the RAID5 volume such that no recovery is possible and data is likely lost. Recovery from such a fatal error is largely a manual process well known to those of ordinary skill in the art and beyond the scope of this discussion. If only one or two storage devices of the enhanced RAID5 volume has failed, step 606 is next operable to resume operation of the enhanced RAID5 volume in a degraded mode. Since the enhanced RAID5 volume can operate in the presence of either a single or double storage device failure, step 606 represents such ongoing operation in the degraded mode where data on failed storage devices may be reconstructed from the data on remaining operable storage devices of the enhanced volume. Such degraded mode operation is in accordance with standard RAID5 or RAID6 management techniques and is generally well known to those of ordinary skill in the art.

Step 608 then determines whether sufficient other spare devices are available in the storage system to allow rebuilding of all failed devices of the enhanced RAID5 volume. If so, step 610 rebuilds all such failed devices using other spare storage devices of the storage system. The failed devices are logically replaced by other spare devices (i.e., other hot spares) and data on the replacement devices is rebuilt in accordance with standard RAID6 management techniques. Having so rebuilt all failed devices, step 612 then resumes normal operation of the enhanced RAID5 volume in a manner that tolerates further failure of two or fewer storage devices of the enhanced volume.

If step 608 determines that sufficient other spare devices are not available to rebuild all failed devices, step 614 determines whether the allocated spare device of the enhanced RAID5 volume is one of the failing devices. If so, then the enhanced RAID5 volume may continue operation reconfigured by step 602 as a standard RAID5 volume (since no more than one of these storage devices of the standard RAID5 volume portion of the enhanced volume failed). If step 614 determines that the allocated spare device was not one of the failing devices (and as noted step 608 determines that insufficient other spare drives are available to rebuild all failed devices), step 616 rebuilds failed device of the standard RAID5 volume that comprises a portion of the enhanced RAID5 volume using the allocated spare device in its more traditional role as a hot spare. Thus, the additional redundancy information previously stored on the additional storage device is removed in favor of rebuilding the information stored on one of the failed devices of the standard RAID5 volume. Step 602 then reconfigures the enhanced RAID5 volume to operate as a standard RAID5 volume using the rebuilt information on the previously allocated spare device (perhaps operating in a degraded mode if another storage device of the standard RAID5 volume remains in a failed state).

Those of ordinary skill in the art will recognize numerous additional and equivalent steps that may be present in the methods of FIGS. 5 and 6. Such additional and equivalent steps are omitted herein for simplicity and brevity of this discussion.

Figure 7:
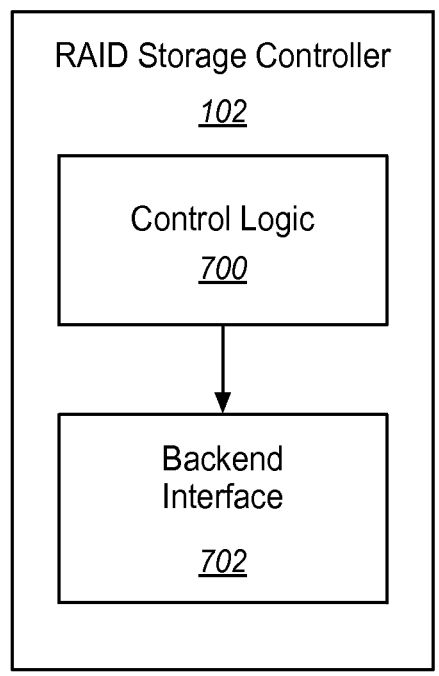
FIG. 7 is a block diagram providing exemplary additional details of an enhanced RAID storage controller as in FIG. 1.

FIG. 7 is a block diagram providing exemplary additional details of enhanced storage controller 102 of FIG. 1. Controller 102 comprises control logic 700 coupled with backend interface 702. Backend interface 702 comprises any suitable circuits for coupling controller 102 with a plurality of storage devices. Interface 702 may comprise, for example, well known commercially available components for interfacing with a plurality of storage devices using PATA, SAS, SATA, FC, etc. Control logic 700 comprises any suitable electronic circuits adapted to store and retrieve data on the plurality of storage devices using interface 702, to receive and process I/O requests (i.e., from attached host systems—not shown), and to provide RAID storage management methods for configuring and operating RAID logical volumes on the plurality of storage devices. Control logic may comprise, for example, commercially available RAID controller circuits. In addition or in the alternative, control logic 700 may comprise a general or special purpose processor and associated memory for storing programmed instructions to be executed by the processor to provide the functions described above.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage system comprising:
a Redundant Array of Independent Disks (RAID) storage controller; and
a plurality of storage devices coupled with the RAID storage controller on which the RAID controller stores one or more logical volumes, the plurality of storage devices comprising a spare storage device,
wherein the RAID storage controller is adapted to configure a RAID level 5 logical volume stored on the plurality of storage devices,
wherein the RAID storage controller is further adapted to allocate the spare storage device to store additional redundancy information associated with the RAID level 5 volume, wherein the RAID level 5 volume in combination with the allocated spare storage device comprises an enhanced RAID level 5 volume, and
whereby the RAID storage controller continues to operate the enhanced RAID level 5 volume to process I/O requests when two of the storage devices comprising the enhanced RAID level 5 volume fail.

2. The storage system of claim 1
wherein the RAID storage controller is further adapted to operate the enhanced RAID level 5 volume to process I/O requests as a standard RAID level 5 volume when the allocated spare storage device fails.

3. The storage system of claim 1
wherein the RAID storage controller is further adapted to operate the enhanced RAID level 5 volume to process I/O requests as a standard RAID level 5 volume when the allocated spare storage device is deallocated from further use with the enhanced RAID level 5 volume.

4. The storage system of claim 1
wherein the RAID storage controller is further adapted to store Galois field multiplication (GFM) values as the additional redundancy information on the allocated spare storage device.

5. The storage system of claim 1
wherein the RAID storage controller is further adapted to store Reed-Solomon values as the additional redundancy information on the allocated spare storage device.

6. The storage system of claim 1
wherein the spare storage device is a dedicated hot spare dedicated for use only with the RAID level 5 volume.

7. The storage system of claim 1
wherein the spare storage device is a global hot spare in the storage system available to be allocated by the RAID storage controller for use with any logical volume stored on the plurality of storage devices.

8. A method operable in a Redundant Array of Independent Drives (RAID) storage controller coupled with a plurality of storage devices, the plurality of storage devices comprising a spare storage device, the method comprising:
configuring a RAID level 5 volume on the plurality of storage devices;
allocating the spare storage device to store additional redundancy information associated with the RAID level 5 volume, wherein the RAID level 5 volume in combination with the allocated spare storage device comprises an enhanced RAID level 5 volume;
generating additional redundancy information for the enhanced RAID level 5 volume;
storing the generated additional redundancy information on the allocated spare storage device; and
operating the enhanced RAID level 5 volume with the additional redundancy information on the allocated spare storage device whereby the RAID storage controller continues to operate the enhanced RAID level 5 volume to process I/O requests when two of the storage devices comprising the enhanced RAID level 5 volume fail.

9. The method of claim 8
wherein the step of generating further comprises generating Galois field multiplication (GFM) values as the additional redundancy information.

10. The method of claim 8
wherein the step of generating further comprises generating Reed-Solomon (RS) values as the additional redundancy information.

11. The method of claim 8 further comprising:
detecting a failure of the allocated spare storage device; and
responsive to detecting the failure of the allocated spare storage device, continuing operation of the enhanced RAID level 5 volume to process I/O requests as a standard RAID level 5 volume.

12. The method of claim 8 further comprising:
reallocating the allocated spare storage device for another purpose; and
responsive to reallocating the allocated spare storage device, continuing operation of the enhanced RAID level 5 volume to process I/O requests as a standard RAID level 5 volume.

13. The method of claim 8
wherein the spare storage device is a dedicated hot spare storage device associated with the RAID level 5 volume.

14. The method of claim 8
wherein the spare storage device is a global hot spare storage device available for use by the RAID storage controller with any volume configured on the plurality of storage devices.

15. A Redundant Array of Independent Disks (RAID) storage controller adapted to couple with a plurality of storage devices, the controller comprising:
a backend interface adapted to couple with the plurality of storage devices; and
control logic coupled with the backend interface and adapted to store and retrieve data on the plurality of storage devices,
wherein the control logic is adapted to configure a RAID level 5 logical volume stored on the plurality of storage devices,
wherein the control logic is further adapted to allocate a spare storage device of the plurality of storage devices to store additional redundancy information associated with the RAID level 5 volume, wherein the RAID level 5 volume in combination with the allocated spare storage device comprises an enhanced RAID level 5 volume, and
whereby the control logic continues to operate the enhanced RAID level 5 volume to process I/O requests when two of the storage devices comprising the enhanced RAID level 5 volume fail.

16. The controller of claim 15
wherein the control logic is further adapted to operate the enhanced RAID level 5 volume to process I/O requests as a standard RAID level 5 volume when the allocated 17. The controller of claim 15
wherein the control logic is further adapted to operate the enhanced RAID level 5 volume to process I/O requests as a standard RAID level 5 volume when the allocated spare storage device is deallocated from further use with the enhanced RAID level 5 volume.

18. The controller of claim 15
wherein the control logic is further adapted to store Galois field multiplication (GFM) values as the additional redundancy information on the allocated spare storage device.

19. The controller of claim 15
wherein the control logic is further adapted to store Reed-Solomon values as the additional redundancy information on the allocated spare storage device.

20. The controller of claim 15
wherein the spare storage device is a dedicated hot spare dedicated for use only with the RAID level 5 volume.

21. The controller of claim 15
wherein the spare storage device is a global hot spare in the storage system available to be allocated by the control logic for use with any logical volume stored on the plurality of storage devices.

* * * * *